Sept. 8, 1953 W. MILLER ET AL 2,651,524

RECORD CHANGER HEAD

Filed Nov. 21, 1946 4 Sheets-Sheet 1

Inventor

WALTER MILLER

JAMES L. D. MORRISON

By J. B. Dickman, Jr.

Attorney

Sept. 8, 1953 W. MILLER ET AL 2,651,524

RECORD CHANGER HEAD

Filed Nov. 21, 1946 4 Sheets-Sheet 2

Inventor
WALTER MILLER
JAMES L. D. MORRISON

By J. B. Dickman, Jr.
Attorney

RECORD CHANGER HEAD

Filed Nov. 21, 1946 4 Sheets-Sheet 3

Inventor
WALTER MILLER
JAMES L. D. MORRISON

By J. B. Dickman, Jr.
Attorney

Sept. 8, 1953 W. MILLER ET AL 2,651,524

RECORD CHANGER HEAD

Filed Nov. 21, 1946 4 Sheets-Sheet 4

Inventor

WALTER MILLER

JAMES L. D. MORRISON

By J. B. Dickman, Jr.

Attorney

Patented Sept. 8, 1953 2,651,524

UNITED STATES PATENT OFFICE 2,651,524

RECORD CHANGER HEAD

Walter Miller and James L. D. Morrison, Benton Harbor, Mich.

Application November 21, 1946, Serial No. 711,450

3 Claims. (Cl. 274—10)

The present invention relates to automatic record changers, and more specifically to the record changer head for use in combination with an offset spindle type of record holder.

In record changer heads used heretofore in this combination, the lowermost record in the stack was ejected either by movement of the head in a straight line radially of the record, or by a slide in the head similarly moved to push the record off the ledge on the spindle.

It has been discovered that a simpler and more reliable way of ejecting the record is by forming an ejector ledge at one side above the normal supporting shoulder on the head and turning the head through a small arc, moving the shoulder from under the stack while causing the ledge to push the lowermost record and sliding it under the remainder of the stack to support it until the head is returned to its starting position when the stack is dropped to the normal supporting shoulder on the head.

The object of the present invention is to provide an oscillatable record changer head, having a shoulder for supporting one edge of a record and having a ledge slightly lower than the thickness of a record to one side above said shoulder, and means for oscillating said head to push the lowermost record and move the ledge under the remainder of the stack until the head is returned to its starting position to again support the stack on said shoulder.

A further object of the present invention is to construct an oscillating changer head for supporting a stack of records at one edge thereof and having means for removing said support and pushing the lowermost record in said stack while supporting the rest of the stack during one turning stroke, and returning it to its starting position during the other or return stroke to support the rest of the stack normally at one edge until the following record changing operation.

A further object of the present invention, is to construct an oscillating record changer head which is adaptable when reversed for use either with 10″ or 12″ records, and which has resilient means for biasing it toward its normal supporting position under one edge of a stack of records, and lost-motion connecting means between said head and the tone arm positioning means providing a stop for said tone arm at its position over the starting grooves in the record when said head is in its normal position.

A further object of the present invention is to construct an oscillating record changer head as above which however instead of reversing to adapt it for use with 10″ or 12″ records is made with a single radially adjustable record supporting member so that it may be adjusted for use with either the 10″ or 12″ records without reversal.

Figures 1, 6:
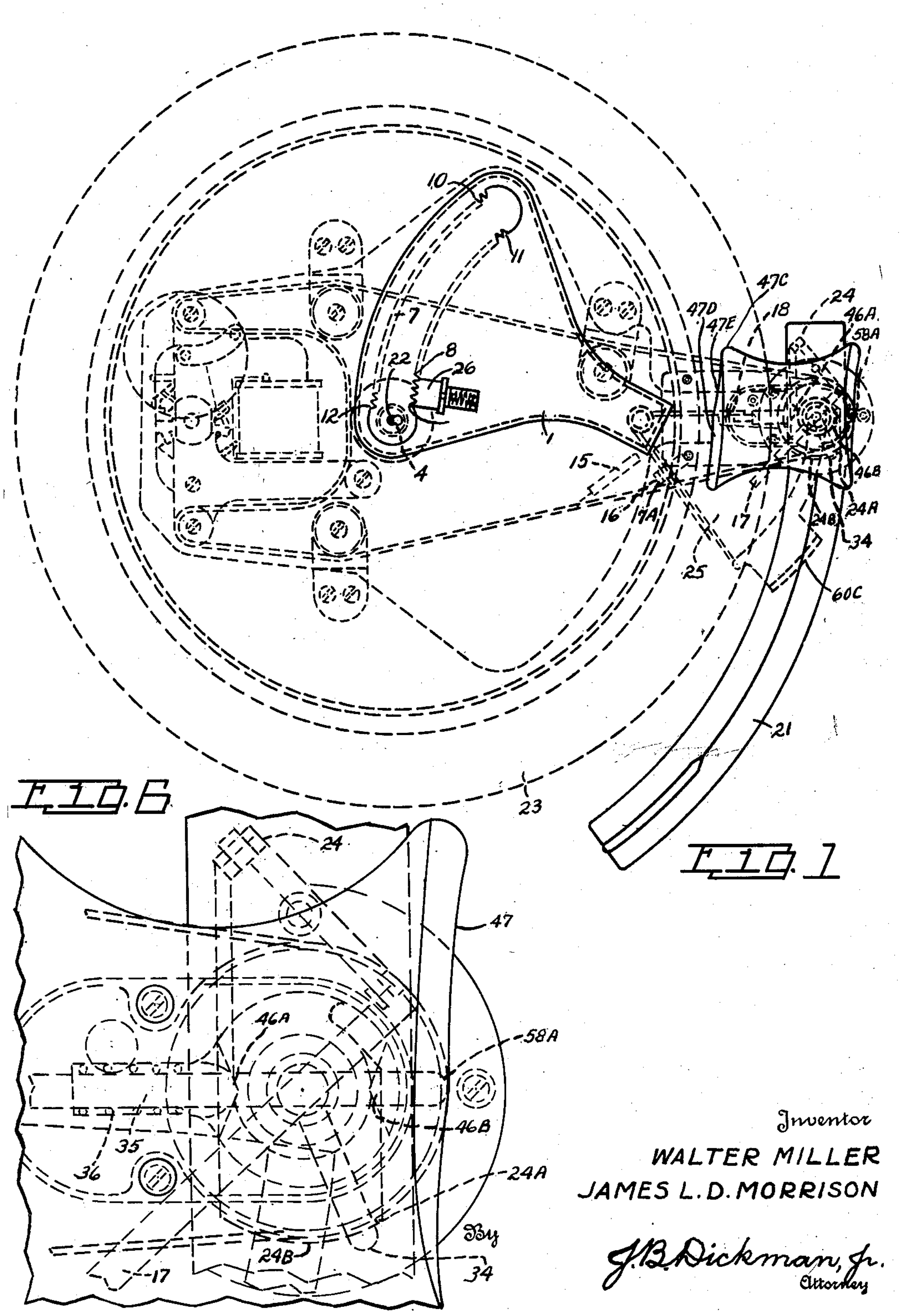
Figure 2:
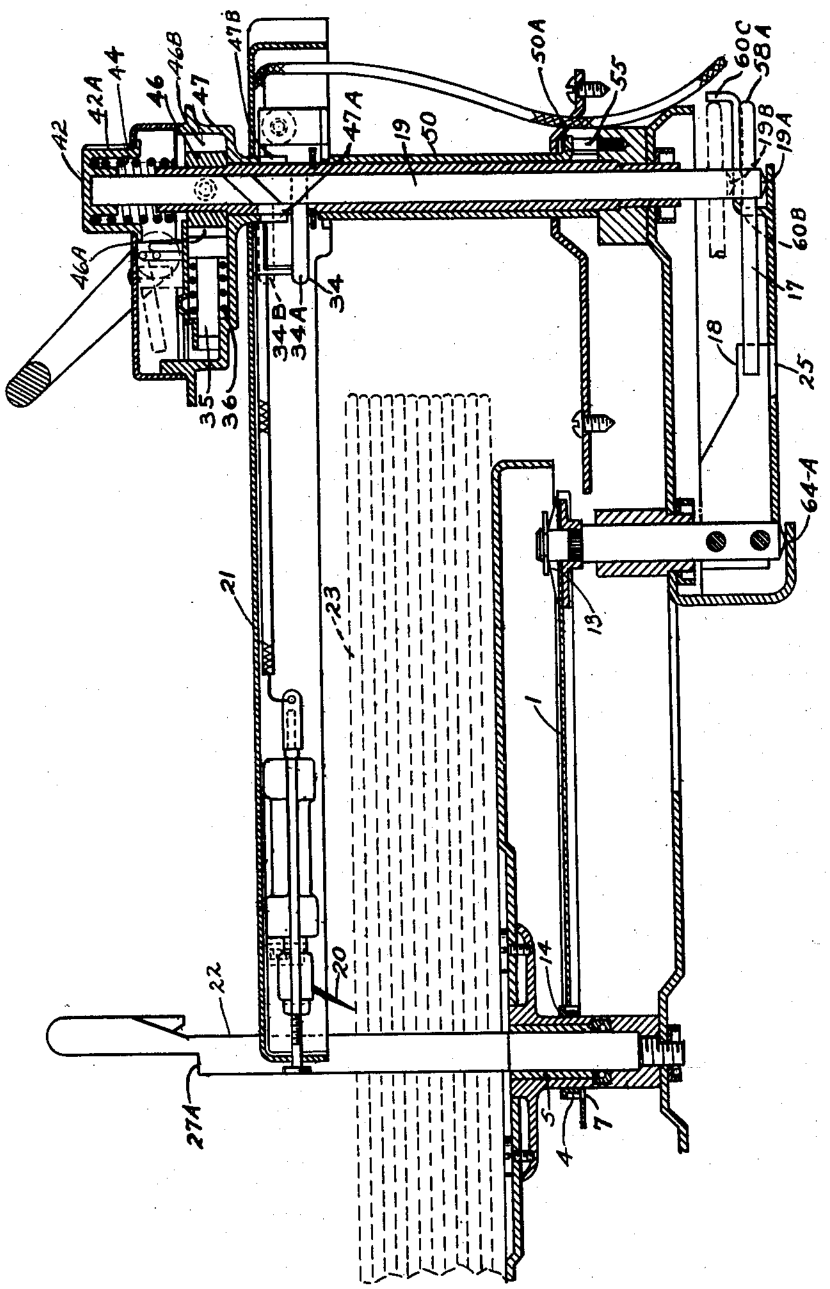
Figure 3:
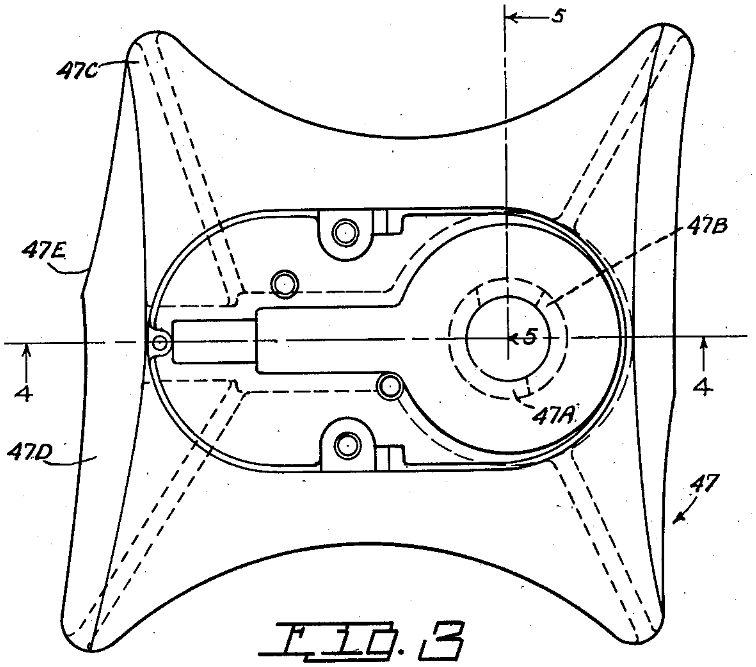
Figure 4:
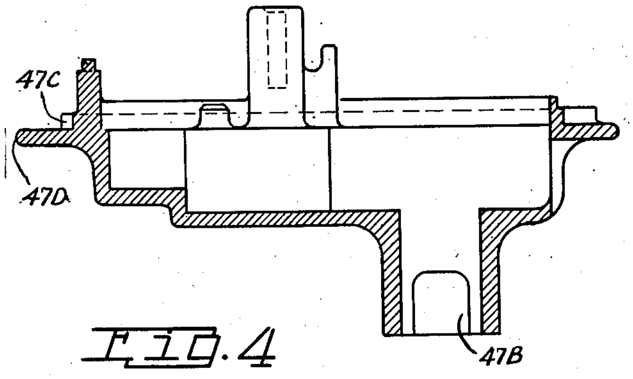
Figure 5:
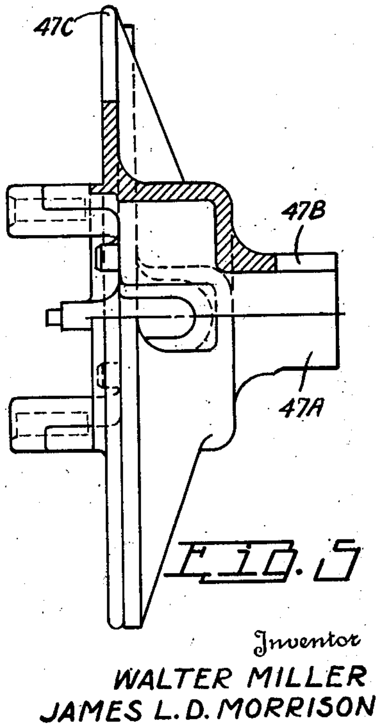
Figure 7:
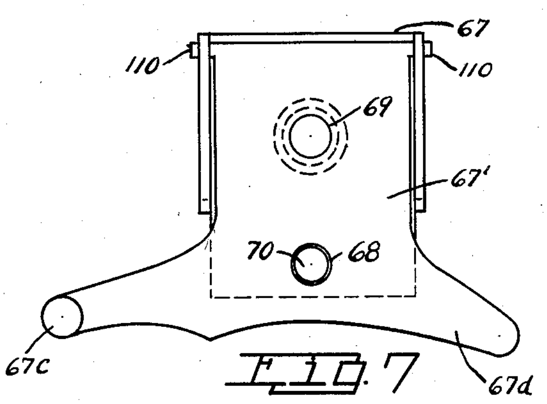
Figure 8:
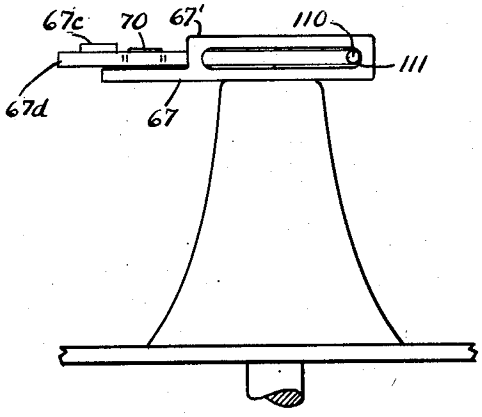
Figure 9:
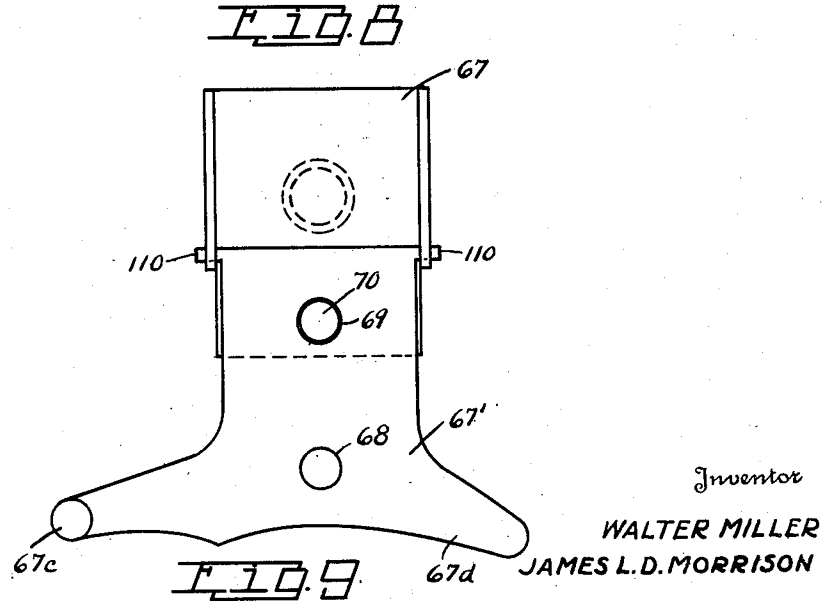

Other objects and more specific objects will become apparent in the following detailed description of some specific forms of devices in accordance with this invention, having reference to the accompanying drawings wherein:

Figure 1 is a plan view of a specific form of record changer head made in accordance with the objects eneumerated above, Figure 2 is a sectional view thereof, Figure 3 is a plan view of the body portion of said head, Figure 4 is a sectional view thereof taken on line 4—4 of Figure 3, Figure 5 is a part-sectional view thereof showing half of the view taken on line 5—5 of Figure 3, Figure 6 is a blown-up view of a portion of Figure 1, Figure 7 is a plan view of another form of head adjusted for use with 12″ records, Figure 8 is an elevational view of Figure 7, and Figure 9 is another plan view thereof with the single radially adjustable record supporting member extended for use with 10″ records.

The record changer heads illustrated here are of the oscillating type. It is obvious, however, that the same principle of using a turntable ledge over the supporting shoulder of the head to push the bottom record in a stack radially off the shoulder of the offset spindle on the turntable, may be used in a rotatable type of record changer, which turns completely around during each cycle of operations.

The disclosure of Figures 1 and 2 is the same as that disclosed in our copending application filed October 17, 1946, Serial No. 703,886, and of which this is a continuation in part.

The head 47 is shown in more detail in Figures 3 to 5 in this application.

As already described in said application, the record changer head 47, shown for purposes of illustration, is a novel oscillating type for use in connection with an offset spindle type of record stack holder. In this form, the operation is accomplished as follows:

The cycle is started by the pin 17 being moved against the projection 18 on the sector 1 as a result of the needle 20 in the tone arm 21 running in the sound groove on the record 23 to the end of the recording thereon. This turns the gear sector 1, as more fully described in our parent application Ser. No. 694,746, filed September 4, 1946, now Patent No. 2,487,771, so that the end 9 of the external gear 8 of the gear sector 1 engages the pinion 4, whereupon the gear sector 1 is turned until the pinion 4 runs off the other end 11 of the external gear 8, this gear in the meantime having been held in mesh with the pinion, in spite of its inclined pitch line, by the shroud 14 on the side of the pinion 4 pressing against the side of the external gear 8 pushing the gear sector out of its normal plane in which it is normally resiliently held by the spring 13. As the pinion 4 runs off the end 11 of the gear 8 the gear sector 1 springs back into its normal plane, bringing the end 10 of the internal gear 7 in mesh with the pinion 4, thus starting the gear sector on its return oscillation stroke. The internal gear 7 is held in mesh with the pinion 4 throughout this return stroke by the shroud 14 pressing against the outer side of the external gear teeth 8 to move the gear sector 1 out of its normal plane in the reverse direction, in accordance with the inclination of the internal gear 7.

When the pinion runs off the end 12 of the internal gear 7, the cycle is completed and the gear sector 1 remains in this position, allowing the pinion 4 to continue rotating with the turntable shaft, until a new cycle is initiated as described above.

In the course of the cycle of operations, one of the functions performed during the oscillation of the gear sector 1, as defined in the copending applications, is the oscillation of the head 47 thru an arc sufficient to push the lowermost record in the stack by means of the shoulder 47C off the ledge 27A in the spindle 22, and clear of the cutaway 47E in the lip 47D of head 47. The detent or latch 35 is resiliently held by spring 36 in the V-groove 46A, or 46B, depending on the size of records being used. As shown, the smaller or 10″ records are being used, and the head is shown in its normal position.

As the gear sector 1 is turned during a portion of its oscillating stroke the projection 60C strikes the end 58A of pin 17 and causes the shaft 19 to turn and with it move pin 34 to the end of the radius 24B where it strikes the projection 24A, fixed to the body of the head 47 in which the latch 35 is mounted. This turns the tone arm until the sleeve 50 on which the tone arm is mounted is stopped by pin 55 acting on a stop 50A on the sleeve. At this time the projection 60C has reached the end of its stroke and is ready to start on its return stroke.

During the movement of pin 34 as defined above, when the needle 20 in the tone arm 21 has reached a position over the starting groove in the record on the turntable, the pin 34 has reached the end of slot 47A in the body 47 whereupon the head is turned along with the tone arm during the remainder of the stroke, against the tension of the latch spring as the latch 35 travels up the V-groove 46A in the cam 46.

On the return stroke in this cycle of operations, therefore, after a new record has been dropped by the shoulder 47C on the head moving it off the ledge 27A on the offset spindle, the tone arm is brought back to its starting position by the latch spring 36 causing the latch 35 to slide down into the V-groove 46A. Thus, when the tone arm is later lowered, it comes down into the starting groove of the new record.

The head 47 therefore performs three functions; it pushes the new record over the shoulder of the offset spindle, permitting it to drop past the radius 47E, and in combination with the latch and cam 46 it returns the tone arm to its proper starting position while moving itself back to its normal record supporting position on lip 47D, as well as permits the use of either 10″ or 12″ records selectively by allowing the head to be held in either one of the two positions corresponding to operation of the latch in either the V-groove 46A or the opposite V-groove 46B.

For manually starting the cycle of operation to change a record, it is merely necessary to use knob 42 by depressing it against the face of spring 44, whereupon the square socket in the knob will be pushed over the square end at top of shaft 19 while being slidably keyed to the casing of the head 47 by means of spline 42A, and the shaft and head assembly may then be turned until the pin 17 strikes the projection 18 on the gear sector assembly. This will start the operation of the cycle in the same manner as in the case where the needle 20 operating in the sound groove of a record 23 reaches the end of said groove, as described above. When the cycle is started, the knob 42 is released, and the spring 44 moves it back into normal inoperative position with respect to the shaft 19.

Instead of the reversible type of head, such as head 47, having two sets of record supporting and sliding members for use with 10″ and 12″ records, a head 67, having only one set of such members 67D and 67C respectively, which are formed on a radially adjustable slide 67′ in said head, may be used with either the 10″ or 12″ records. As shown in Figures 7 to 9, the head 67 is provided with a slide 67′ held in either of the two adjusted positions by selectively moving either of the holes 68 or 69 over the pin 70, with the hinge pins 110 of slide 67′ in the corresponding ends of slots 111. Thus in the position shown in Figure 7 the head may be used with 12″ records, while in that shown in Figure 9 it may be used with 10″ records. The cam 46 used in connection with this type of head need have only one V-groove 46A.

From the above illustrative forms of head and latch, it will be obvious that various modifications may be made without departing from the spirit of the invention.

What is claimed is:

1. In a record changer having a spindle extending upwardly from a turntable in alignment with the axis thereof, a ledge carried by the spindle and extending laterally from one side thereof in vertically spaced relation to the turntable and upon which the center portions of a stack of record disks is supported above the turntable, a tone arm adjacent the turntable to move about a vertical axis toward the axis of the turntable during the playing of a record and to shift vertically and move beyond the edge of the turntable upon completing the playing of the record, a head mounted above the tone arm to oscillate about the vertical axis, a slide carried by the head for adjustment radially to the vertical axis of the head for movement with the head in a horizontal arcuate path about said vertical axis, a record supporting lip carried by the slide for movement therewith from a position beneath the stack of records to a position to one side of the stack of records, means carried by the head and operatively connected to the tone arm for moving the lip to one side of the stack of records when the tone arm moves beyond the edge of the turntable, and a shoulder carried by the slide movement therewith toward the spindle to urge the bottommost record off of the ledge when the lip moves to one side of the stack of records.

2. The structure defined in claim 1 in which the head carries an upstanding pin and the slide is provided with longitudinally spaced openings for receiving the pin and holding the slide in adjusted position on the head.

3. The structure defined in claim 2 in which the head carries spaced parallel upwardly extending flanges having elongated longitudinally extending slots extending therethrough, and the slide carries laterally extending ears which project into the slots for slidably retaining the slide on the head.

WALTER MILLER.
JAMES L. D. MORRISON.

References Cited in the file of this patent

UNITED STATES PATENTS

| Number | Name | Date |
|---|---|---|
| 1,469,152 | Boumphrey | Sept. 25, 1923 |
| 2,090,746 | Compare | Aug. 24, 1937 |
| 2,352,331 | Leline | June 27, 1944 |
| 2,394,539 | Erwood et al. | Feb. 12, 1946 |
| 2,395,026 | Weaver | Feb. 19, 1946 |
| 2,484,775 | Zandelin et al. | Oct. 11, 1949 |
| 2,536,432 | Faulkner | Jan. 2, 1951 |
| 2,561,792 | Emde | July 24, 1951 |

FOREIGN PATENTS

| Number | Country | Date |
|---|---|---|
| 281,003 | Great Britain | Nov. 23, 1927 |
| 317,895 | Great Britain | Aug. 26, 1929 |